United States Patent [19]

Strube

[11] 4,214,011
[45] Jul. 22, 1980

[54] FIBER-REINFORCED, ACTIVATED, ZEOLITE MOLECULAR SIEVE TABLETS AND CARBONATION OF AQUEOUS BEVERAGES THEREWITH

[75] Inventor: Herbert E. Strube, Cincinnati, Ohio

[73] Assignee: The Procter & Gamble Company, Cincinnati, Ohio

[21] Appl. No.: 967,184

[22] Filed: Dec. 7, 1978

[51] Int. Cl.² .......................... A23L 2/40; B01J 29/04
[52] U.S. Cl. .......................................... 426/591; 55/75; 252/11; 252/39; 252/427; 252/455 Z; 252/477 R; 426/477
[58] Field of Search ........................ 426/67, 90, 96, 97, 426/285, 330.3, 590, 591, 454, 477; 252/11, 39, 56 R, 427, 430, 455 Z, 477 R; 99/275, 279, 323.1, 323.2; 55/75; 423/328, 437; 261/121 R, DIG. 7

[56] References Cited

U.S. PATENT DOCUMENTS

| 2,973,327 | 2/1961 | Mitchell et al. | 255/455 Z |
| 3,013,884 | 12/1961 | Fellers | 426/285 |
| 3,042,531 | 7/1962 | Leal et al. | 426/454 |
| 3,518,343 | 6/1970 | Welsh et al. | 426/591 X |
| 3,888,998 | 6/1975 | Sampson et al. | 426/67 |
| 4,007,134 | 2/1977 | Liepa et al. | 426/67 X |
| 4,025,655 | 5/1977 | Whyte et al. | 426/590 X |
| 4,123,390 | 10/1978 | Sherman et al. | 426/67 X |

Primary Examiner—Arthur L. Corbin
Attorney, Agent, or Firm—Leonard Williamson; Richard C. Witte; Rose Ann Dabek

[57] ABSTRACT

A composition of matter comprising a mixture of activated or $CO_2$ loaded zeolite molecular sieve material, a small amount of a tabletting lubricant and an effective amount of some non-swelling fibers, preferably of the size of from about 100 to about 2,000 microns in length and from about 1 to about 50 microns in diameter, said composition of matter being used for making structurally stable, non-fired, zeolite tabletted, rigid, composite bodies therefrom. When charged with $CO_2$ the fiber-reinforced tabletted body makes an excellent beverage carbonation device.

28 Claims, 5 Drawing Figures

FIBER-REINFORCED, ACTIVATED, ZEOLITE MOLECULAR SIEVE TABLETS AND CARBONATION OF AQUEOUS BEVERAGES THEREWITH

TECHNICAL FIELD

Non-fired rigid composite bodies containing crystalline zeolite molecular sieves for charging with a gas, e.g., carbon dioxide, to be released when said body is brought into contact with water or an aqueous beverage.

BACKGROUND ART

This invention relates to a zeolite device adaptable for the carbonation of aqueous beverages at the point of consumption. Carbonation is accomplished by contacting the water or the beverage to be carbonated with the device comprising "molecular sieves", i.e., crystalline aluminosilicates, which contain adsorbed gaseous carbon dioxide. Carbon dioxide is released from the molecular sieves by displacement with water from the beverage solution. The liberated carbon dioxide is then dissolved into the liquid to form the carbonated beverage. The molecular sieves are bonded into a monolithic structure having sufficient surface area for contact between the aqueous beverage to be carbonated and the molecular sieves so as to provide means for a ready displacement of the carbon dioxide to be released by water from the beverage solution.

Commercial beverage carbonation usually involves carbon dioxide-liquid contact under pressure with intensive mixing in a cooled container. Such commercial methods, of course, require elaborate and sophisticated equipment not available at the point of beverage consumption.

Thus, it was proposed in U.S. Pat. No. 3,888,998, June 10, 1975 to Sampson et al., which was a continuation-in-part of application Ser. No. 200,849, filed Nov. 22, 1971, now abandoned, that aqueous beverages could be advantageously carbonated at the point of consumption with the use of an effective amount of a crystalline aluminosilicate molecular sieve material having adsorbed therein at least about 5% by weight of carbon dioxide.

Molecular sieves of the type used in carbonating beverages at the point of consumption are taught in said U.S. Pat. No. 3,888,998 herein incorporated by reference in its entirety.

Carbonation in accordance with the latter-named method necessitates contacting the molecular sieves with the beverage liquid. Generally, the molecular sieves loaded with $CO_2$ are placed in a container, and the liquid to be carbonated is then added in sufficient amount to cover the sieves. Heretofore, referred to above, as U.S. Pat. No. 3,888,998, carbonation has been accomplished by utilizing a multiplicity of small molecular sieve agglomerates, such as produced following the teachings of U.S. Pat. No. 2,973,327, issued Feb. 28, 1961, to William J. Mitchell et al., or by utilizing a solid disk of molded and fired molecular sieves. The agglomerates are typically either spherical in shape, commonly known as beads, or roughly cylindrical in shape, commonly known as pellets.

The use of a multiplicity of molecular sieve agglomerates, however, is disadvantageous due to the disadvantages inherent in using the small particles. Since the molecular sieve agglomerates are not in themselves designed for internal consumption, the molecular sieve bodies must be enveloped or otherwise constrained so as to be readily separable from the liquid beverage upon consumption. These various encasements of the molecular sieve bodies may have economical, aesthetic, or other disadvantages which preclude their use for commercial marketing purposes. A composite molecular sieve body would overcome many of these disadvantages inherent in the use of a multiplicity of small agglomerates. However, there are severe technical problems in formulating a suitable monolithic structure. Many of these problems were solved by an extruded zeolite device containing molecular sieves and clay, and having a number of liquid-permeable channels, as taught in U.S. Pat. No. 4,007,134 to Liepa and Japikse, Feb. 8, 1977, herein incorporated by reference in its entirety.

Tabletting problems as stated in the Liepa and Japikse patent are as follows:

"A solid molecular sieve disk, or tablet, made from either compressed molecular sieves or from a mixture of aluminosilicates bonded together with a clay mineral binder tends to be unsatisfactory in that these bodies have encountered problems when used for carbonating liquid beverages. In order to obtain sufficient carbonation of the aqueous beverage, that is, both a sufficient amount of $CO_2$ released into the beverage and a minimal rate of $CO_2$ generation to maintain the beverage in a carbonated state, the molecular sieves must have adsorbed therein at least a certain amount of $CO_2$. However, when these solid disks which contain an effective amount of gaseous carbon dioxide are placed in the liquid beverage environment, the pressure generated by the carbon dioxide release from the molecular sieves is often so extreme as to cause disintegration or destruction of the disk body. If precautions are taken to prevent this, specifically, using a binder composition which imparts sufficient strength to the composite body so as to maintain its structural integrity, then the binder causes a decrease in the rate of release of the carbon dioxide. This can result in either unacceptably low carbonation levels or unacceptably long carbonation times."

Thus, it is the object of the present invention to formulate a fiber reinforced non-fired zeolite rigid composite body which, when charged with a sufficient amount of carbon dioxide, will satisfactorily carbonate an aqueous beverage without the destruction or dissolution of said body.

It is also an object of this invention to provide a non-fired fiber reinforced zeolite tabletted device which effectively carbonates a beverage in a commercially acceptable time period at the point of consumption.

Yet another object of the present invention is to provide a method of making a non-fired rigid composite zeolite tablet.

It is a further object of the instant invention to provide simple but effective devices for suitable gas adsorption. These and other objects readily apparent to those skilled in the art will be apparent from the disclosure and appended claims.

BRIEF SUMMARY OF THE INVENTION

The instant invention provides methods, compositions and devices for carbonating instant beverages, prepared from dry beverage mixes. In another respect this invention provides an improved method of making tabletted devices from activated or $CO_2$-loaded crystalline zeolite molecular sieves comprising uniformly mixing said zeolite molecular sieves, a tabletting lubricant, and some hydrophobic or non-swelling hydrophilic fibers, and tabletting. The $CO_2$-loaded zeolite tablet device provides improved release of adsorbed carbon dioxide for beverage carbonation. Such tablets as are produced by the present invention provide a convenient and economical carbonation system for both individual and multiple servings of carbonated beverages. They can readily be combined with a suitable liquid-containing vessel to provide unique point-of-consumption carbonated beverages. The employment of fibers provides a structurally stable device which allows an increase in aqueous penetration rates into the zeolite tablet for an increase in the rate of $CO_2$ release.

BRIEF DESCRIPTION OF THE DRAWINGS

Although the specification concludes with claims particularly pointing out and distinctly claiming the subject matter forming the present invention, it is believed that the same will be better understood by reference to the following specification taken in connection with the accompanying drawings in which:

Figure 1:
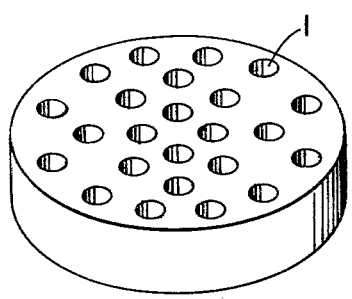
FIG. 1 is a perspective view of a preferred embodiment of the present invention wherein the crystalline zeolite tablet is in the shape of a disk or tablet having several elongated channels running substantially parallel to the vertical dimension of the tablet.
Figure 2:
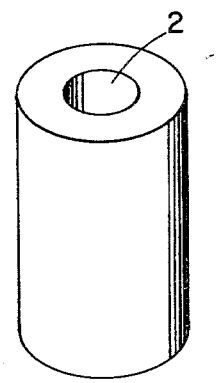
FIG. 2 is a perspective view of another preferred embodiment of the present invention wherein the rigid composite tablet is in the form of a cylinder with one elongated channel running through the vertical center of the cylinder.
Figure 3:
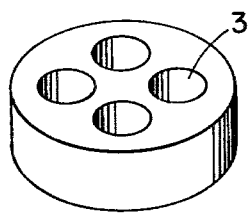
FIG. 3 is another preferred embodiment wherein the tablet is in the shape of a disk having four elongated channels running through the vertical dimension of the disk.
Figure 4:
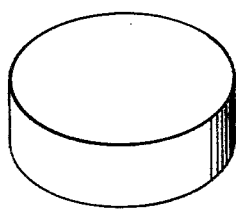
FIG. 4 is a tabletted solid disk.
Figure 5:
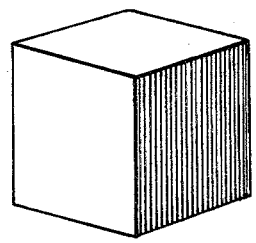
FIG. 5 is another preferred embodiment of this invention in the shape of a cube.

While the invention will be described in connection with the preferred embodiments illustrated in the figures, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

The instant invention provides a composition of matter comprising:
(a) from about 82 to about 98.5 wt. % of activated crystalline zeolite molecular sieves material;
(b) from 1 to about 15 wt. % of hydrophobic or non-swelling hydrophilic fibers;
(c) from about 0.5 to about 3 wt. % of a tabletting lubricant,
wherein said composition is uniformly mixed and tabletted into a rigid composite tablet. Preferably, this composition comprises:
(a) from about 87.5 to about 98 wt. % of said zeolite material;
(b) from about 1 to about 10 wt. % of said fibers; and
(c) from about 1 to about 2.5 wt. % of said lubricant.

Most preferably, said zeolite material comprises from about 94% to about 97%; said fibers comprise from about 2% to about 5%; and 1% said lubricant.

To obtain the necessary carbon dioxide adsorption capability needed to carbonate a beverage at the point of consumption, it has been found necessary to employ molecular sieves since some common adsorbents, such as charcoal and silica gel, do not have the adsorptive capacity necessary for this purpose. Molecular sieves, or crystalline aluminosilicates, are also sometimes referred to as crystalline zeolites and are both natural and synthetic in origin. Natural crystalline aluminosilicates exhibiting molecular sieve activity include, for example, analcite, paulingite, ptilolite, clinoptilolite, ferrierite, chabazite, gmelinite, levynite, erionite, and mordenite.

Since not all of the natural crystalline aluminosilicates are available in abundance, considerable attention has been directed to the production of synthetic equivalents. Three basic types of crystalline aluminosilicate molecular sieves most readily available on a commercial scale have been given the art-recognized designation of "zeolite A", "zeolite X" and "zeolite Y". Other molecular sieves which have been synthesized include Zeolites B, F, G, H, K-G, J, L, M, K-M, Q, R, S, T, U and Z.

A full disclosure of the above zeolites are found in U.S. Pat. No. 4,007,134 to Liepa and Japikse, Feb. 8, 1977, herein incorporated by reference in its entirety.

It has been discovered that the formation of a tablet with high-speed commercial equipment requires the use of a lubricant in the powder formula to allow for removal from the die. A preferred high-speed press is the Dorst Powdered Metal Compaction Press, Model DK100, manufactured by Dorst Keramikmaschinen Bau Inhaber Otto Dorst und. Dipl.-ing, Walter Schlegel, 8113 Kochel am See Bundes-republik Deutschland, and sold in the U.S. by A.C. Compacting Presses, 1952 Woodbridge Ave., Edison, N.J. 08817.

The tabletting lubricant is preferably a metal fatty acid ester and more preferably a metal stearate selected from the group consisting of magnesium, aluminum or calcium stearate. Other common tabletting lubricants are useful in the practice of the present invention, i.e. a hard Carbowax ® (polyethylene glycol) and hydrogenated vegetable oil. However, the most preferred tabletting lubricant is magnesium stearate. The desired performance characteristics of the resulting pressed powder tablet are controlled by three factors. They are tablet shape, compaction pressure, and the addition of hydrophobic or non-swelling hydrophilic fibers. The first controls the amount of wettable tablet surface and the diffusional path length while the latter two affect the porosity and strength of the tablet.

In order to activate the molecular sieve material, the material is fired at elevated temperatures before mixing in the fibers. The activated sieve material is then mixed with a small percentage of specially prepared fibers and a small amount of lubricant, and then compacted and granulated to yield free-flowing granules, i.e. powder.

The following fibers have been processed such that they provide the desired characteristics: polyethylene, polypropylene, polyester, nylon and cellulose. The physical characteristics of the fibers are critical. They must be hydrophobic or substantially non-swelling when brought in contact with water. A hydrophilic fiber treated with a hydrophobic agent will suffice. Thus, the term "hydrophobic fibers" as used herein includes substantially non-swelling hydrophilic fibers too. Suitable physical dimensions for the fibers for the preferred embodiment of this invention have a length of from about 100 to about 2000 microns and a diameter of from about 1 to about 50 microns; more preferably, about 400 to about 1500 microns in length and most preferably about 800 to about 1000 microns in length with diameters of 20 to 40 microns.

For purposes of the present invention, the material adsorbed within the molecular sieve tablet is gaseous carbon dioxide. Carbon dioxide is strongly adsorbed on such sieves, but is readily displaced by the stronger and preferential adsorption of water. Hence, release of the adsorbed carbon dioxide from molecular sieves in aqueous solution provides the basis for the carbonation technique utilized in the present invention.

The total amount of carbon dioxide capable of being adsorbed by the molecular sieves and the rate of desorption, that is, the rate at which the carbon dioxide is released by the molecular sieves by displacement with water molecules, varies with the pore size of the molecular sieves. Thus, varying the pore size of the molecular sieves employed in the instant invention, that is, utilizing different molecular sieve types in the formulation of the composite body, affects both the carbonation rate and the final carbonation level of the aqueous beverage.

Also, in accordance with the present invention, the tabletted composite bodies may contain any of a number of optional materials, as long as the ultimate use of the bodies, i.e. carbonating an aqueous beverage, is not adversely affected thereby. Of course, those skilled in the art will appreciate that there are a large number of such optional materials which may be added to the composite bodies of the present invention without adversely affecting their adsorption capacities.

In keeping with the present invention, the composite bodies are prepared by blending or mixing the molecular sieves, a suitable hydrophobic or non-swelling hydrophilic fiber material, and a suitable tabletting lubricant. A preferred method involves blending together $CO_2$-loaded molecular sieves, the fibers and the tabletting lubricant. The mixture is then pressed in a die to form a tabletted body. A preferred amount of pressure for tabletting the rigid composite bodies of the present invention is about 1400 kg/cm$^2$ or 20,000 lb/in$^2$ in English units. The tabletted body is then ready. No firing is necessary or desirable.

The preferred embodiments illustrated in the figures include a cube, some disks with and without channels, and a cylinder with one channel. Other alternative shapes which may be tabletted are included within the scope of the invention.

INDUSTRIAL APPLICATION

An application of the device of the present invention is use of one or more of the embodiments illustrated by the figures as a beverage carbonation device. Other applications of this invention are disclosed in U.S. Pat. No. 4,007,134, supra, herein incorporated by reference in its entirety. Still other applications will be obvious to those skilled in the art.

The molecular sieves are "loaded", that is, charged, with carbon dioxide merely by contacting the activated sieve material with gaseous carbon dioxide under substantially anhydrous conditions to bring about carbon dioxide adsorption. Typically, the sieve materials can be dehydrated to less than 1% by weight of water. It is not necessary that the composite bodies be contacted with carbon dioxide for an extremely long period of time in order to achieve adequate adsorption of carbon dioxide by the molecular sieves, as it has been found that after contacting the molecular sieve bodies with carbon dioxide for only 5 minutes, 70% of the total capacity of the bodies for carbon dioxide adsorption has been exhausted through adsorption of carbon dioxide by the molecular sieves. For use in the instant beverage carbonation devices, the activated zeolite molecular sieves should be loaded to the extent of at least about 5% by weight (i.e. weight of carbon dioxide adsorbed/weight of loaded sieves $\times$ 100%). The extent to which a particular size of sieves, i.e. sieves with a given pore size, adsorb carbon dioxide at any particular temperature or pressure is easily determined by experimentation or by utilization of adsorption data available for commercially available sieves.

It is important that the carbon dioxide-loaded molecular sieve bodies be packaged and stored in a manner which will prevent contact with atmospheric moisture prior to use in the present invention. Such atmospheric moisture would displace carbon dioxide, rendering the sieves ineffective for beverage carbonation.

The carbon dioxide-loaded molecular sieves are contacted with an aqueous potable liquid to effectuate the carbonation of the aqueous beverage. Carbon dioxide is released from the molecular sieves by the preferential adsorption of water from the beverage solution. A carbonated beverage results when this released carbon dioxide is dissolved in the aqueous liquid. Subsequent release of this dissolved carbon dioxide in the mouth upon drinking provides the characteristic feel and taste of a carbonated beverage. Of course, the extent of carbonation increases as more carbon dioxide is dissolved. Carbonation is usually measured in a unit, hereinafter referred to as "volumes of dissolved $CO_2$" or "volumes of carbonation" defined as the volume of gas (reduced to standard conditions, i.e. 760 mm Hg and 0° C.) dissolved in a given volume of beverage.

The solubility of carbon dioxide in aqueous solution is strongly a function of temperature and pressure. Solubility data under various temperature and pressure conditions can easily be determined from prior art literature. General discussions of this subject as it relates to this field are disclosed in U.S. Pat. No. 4,007,134, supra. Thus, the discussion of certain temperature and pressure limitations apply to the carbonation bodies of the present invention.

Carbonation time is important in many applications and faster carbonation and more control for tabletted bodies are achieved, but is not a critical variable in the composite carbonation bodies of the present invention. Time of contact of the loaded molecular sieve disks with the beverage liquid will naturally vary with the amount of aqueous solution present, the nature of that solution, the amount, type, and level of charge of the molecular sieves employed, and the "strength" of carbonated beverage desired. By employing molecular sieves loaded with carbon dioxide to the extent of at least 5% by weight and by carbonating at temperature and pressure conditions of the present invention, suitably carbonated beverages can be obtained after typical in-home carbonation times (1-5 minutes). Carbonation systems providing carbon dioxide release for longer times than typical can be achieved by utilizing other molecular sieve types or fibers than those illustrated in the Examples below.

The type of beverage solution to be carbonated by the process of the instant invention is not critical. The beverage liquid must, of course, be aqueous in nature.

Such liquids can contain, in addition to water, any type of non-interfering flavorant, coloring agent, food additive, medicine, or alcohol. Some materials, such as aroma and flavor constituents, can alternatively be incorporated into the molecular sieve bodies. In still another variation, flavorings and colorings can be provided in an aqueous mixture which is added to water along with the carbon dioxide-loaded molecular sieve disks. Examples of the types of beverage which can be made from suitable liquids by carbonation with the present invention include soft drinks, medicinal preparations, beer and sparkling wine.

EXAMPLE I

Formation of a Rigid Composite Tablet from a Mixture of Activated Crystalline Zeolite Molecular Sieve Material and Fibers Ingredient Preparation:

1. Crystalline zeolite molecular sieve material (zeolite):
   Union Carbide Sodium Y Zeolite is heated to 540° C. to drive off all $H_2O$, organic material, etc. from its crystalline structure. The zeolite is then cooled down under nitrogen to room temperature. It is now in the "activated" state.
2. Fibers:
   Buckeye Cellulose cotton linter dry lap pulp #505 is cut into 5 mm sq. pieces. These pieces are fed through a laboratory hammer mill with a 0.060" screen. The resulting fibers have a mean average length of 950 microns and a mean average diameter of 20–30 microns. These fibers are substantially non-swelling hydrophilic fibers.

Formulation:

Said above ingredients are mixed in a ratio of 97 gms. of activated zeolite, 2 gms. of fibers, and 1 gm. of Magnesium Stearate (Mg. Stearate is a common tabletting lubricant and is used as an aid in compaction and to reduce tablet ejection forces). The ingredients are intensively mixed in a laboratory sized Waring Blender. They are kept under a dry air or $N_2$ atmosphere.

Tablet Formation:

Formation of a 2.25" diameter×0.4" thick disk. Twenty-four gms of the above-formulated material is placed in a 2.25" diameter disk die. The die and materials are vibrated to insure a uniform material density throughout the die. An upper punch is placed in the die and pressed against the powder with sufficient force to exert an average compressive force on the powder of 20,000 psi. The now-formed body is ejected from the die having a density of about 0.82 gm/cm$^3$. The disk is kept under an $N_2$ atmosphere.

The strength of this tabletted disk was tested by centering it on two pedestals separated from each other by about 1.5 inches. A downwardly directed controlled force was gradually applied to the center of the disk through a ½ inch diameter and 1 inch long dowel pin, positioned so that its 1 inch center line was laid on the disk parallel to the edges of the pedestals. It took about one hundred twelve pounds (112#) of force to break the disk.

The disk possesses good dimensional accuracy which is readily reproducible. At this time the disk can be placed in the appropriate atmosphere where the zeolite will readily adsorb certain polar molecules (i.e. $CO_2$, $H_2O$, etc.).

Rigid composite tablets can be formed in any conceivable shape (i.e. tablets, balls, cubes, cylinders, stars, etc.) as long as the appropriate die and punch can be produced.

EXAMPLE II

Strength of Tablet Versus Zeolite-to-Fiber Ratio

Ingredient Preparation:

1. Crystalline zeolite molecular sieve material, Union Carbide Sodium Y Zeolite is heated typically to about 540° C. to drive off all $H_2O$, organic material, etc. from its crystalline structure. The zeolite is then cooled down under nitrogen. It is now in the activated state.
2. Hydrophobic Fibers—"Minifibers", polypropylene filament #753025, of a 3.0 denier and cut to ¼" length—are fed through a laboratory hammer mill with a 0.039" screen. The resulting fibers have a length of from about 100 to about 2000 microns and a diameter of about 30 microns. Granulated dry ice is also fed into the hammer mill to prevent over-heating of the fibers. The resulting fibers are dried in an oven at about 65° C.

Formulation:

Said above ingredients are mixed in the following ratios:
  Sample A (0% fibers), 99 gms zeolite, 0 gms fibers, and 1 gm Mg. Stearate.
  Sample B (1% fibers), 98 gms zeolite, 1 gm fibers, and 1 gm Mg. Stearate.
  Sample C (3% fibers), 96 gms zeolite, 3 gms fibers, and 1 gm Mg. Stearate.
  Sample D (10% fibers), 89 gms zeolite, 10 gms fibers, and 1 gm Mg. Stearate.
Ingredients are intensively mixed in a laboratory sized Waring Blender. They are then kept under a dry air or $N_2$ atmosphere.

Fabrication:

Rigid bodies (tablets) are formed as follows:
22.78 gms of the desired above-formulated material is placed in a 2.25" diameter disk die. The die and materials are vibrated to insure a uniform material density throughout the die. An upper punch is placed in the die and pressed against the powder with sufficient force to exert an average compressive force on the powder of 24,000 psi. The now-formed body (tablet) is ejected from the die. The tablet is kept under an $N_2$ or dry air atmosphere.

Tablet Strength Determination:

The tablets are broken on the tablet breaking device, as described in Example I.

TABLE 1

| Sample | % Fibers | Force to Break Tablets | |
|--------|----------|------|---------|
|        |          | Dry  | Wet [1] |
| A | 0%  | 76#  | —[2] |
| B | 1%  | 78#  | 48#  |
| C | 3%  | 90#  | 54#  |
| D | 10% | 130# | 73#  |

[1] Tablets are soaked in $H_2O$ prior to breaking test.
[2] Tablets disintegrated in $H_2O$ when no fibers were present.
(#) Pounds of force needed to break the sample tablets.

EXAMPLE III

A $CO_2$-loaded rigid composite tablet was made following the procedure set out in Example I, except that the activated zeolite material was charged with $CO_2$ at about 70° C. until equilibrium was reached. The zeolite adsorbed about 22% $CO_2$ by dry weight of the zeolite.

Then the mixing and tabletting was conducted the same as in Example I, except that it was carried out under a $CO_2$ atmosphere.

The $CO_2$-loaded tablet, when brought into contact with an aqueous beverage making liquid, rapidly evolved carbon dioxide in the form of numerous tiny gas bubbles, and a sparkling, effervescent, carbonated beverage, similar to conventional, commercial carbonated cola beverages obtained directly from a bottle, is attained in less than 2 minutes. The beverage has a "bite" or "tang" of carbon dioxide, as commonly observed in carbonated beverages and has no off-flavor or off-odor. $CO_2$-loaded tablets tested upon examination showed substantially no change in size or shape.

What is claimed is:

1. A composition of matter for preparing a non-fired, rigid composite, porous and activated zeolite molecular sieve material tablet for adsorbing and releasing adsorbable gases, said composition comprising:
   (a) from about 82 to about 98.5% wt. % of activated crystalline zeolite molecular sieve material;
   (b) from about 1 to about 15 wt. % of fibrous material selected from the group consisting of hydrophobic fibers and non-swelling hydrophilic fibers; and
   (c) from about 0.5 to about 3 wt. % of tabletting lubricant;
wherein said (a), (b) and (c) are uniformly mixed and tabletted into said rigid composite, porous and activated tablet.

2. The composition of claim 1 wherein said composition comprises:
   (a) from about 87.5 to about 98 wt. % of said zeolite material;
   (b) from about 1 to about 10 wt. % of said fibers; and
   (c) from about 1 to about 2.5 wt. % of said lubricant.

3. The composition of claim 1 wherein said zeolite material comprises from about 94 to about 97%, said fibers comprise from about 2 to about 5%, and 1% of said lubricant.

4. The composition of claim 1 wherein said lubricant is a metal fatty acid ester.

5. The composition of claim 1 wherein said lubricant is metal stearate selected from the group consisting of magnesium, aluminum or calcium stearate.

6. The composition of claim 1 wherein said lubricant is magnesium stearate.

7. The composition of claim 1 wherein said lubricant is hydrogenated vegetable oil.

8. The composition of claim 1 wherein said lubricant is a hard polyethylene glycol.

9. The composition of claim 1 wherein said fibers have a length of from about 100 to about 2000 microns and a diameter of from about 1 to about 50 microns.

10. The composition of claim 1 wherein said fibers have a length of from 400 to about 1500 microns and a diameter of from about 1 to about 40 microns.

11. The composition of claim 1 wherein said fibers have a length of from about 800 to about 1000 microns and a diameter of from 1 to about 20 microns.

12. The composition of claim 1 wherein said fibers are selected from the group consisting of polyethylene, polypropylene, polyester, nylon, and cellulose.

13. The composition of claim 1 wherein said tablet is charged with $CO_2$ in an amount of at least 5% by weight of said activated zeolite material.

14. A composition of matter for preparing a $CO_2$-load rigid composite tablet comprising:
   (a) from about 82 to about 98.5 wt. % of activated crystalline zeolite molecular sieve material;
   (b) from about 1 to about 15 wt. % of fibrous material selected from the group consisting of hydrophobic fibers and non-swelling hydrophilic fibers; and
   (c) from about 0.5 to about 3 wt. % of tabletting lubricant;
wherein said activated crystalline zeolite material is loaded with $CO_2$ in an amount of at least 5% by weight of said zeolite material, and wherein said loaded zeolite material, said fibers and said lubricant are intimately mixed and compacted and granulated to form free-flowing granules, and wherein said granules are tabletted into said $CO_2$-loaded rigid composite tablet.

15. The rigid composite tablet of claim 1 or claim 14 wherein said tablet is shaped in a geometric form selected from the group consisting of disks with or without channels cylinders with one channel.

16. A method of carbonating an aqueous beverage at the point of consumption which comprises contacting a non-fired $CO_2$-loaded, rigid composite body with the aqueous beverage to be carbonated, said rigid composite body comprising:
   (a) from about 82 to about 98.5 wt. % of activated crystalline zeolite molecular sieve material;
   (b) from about 1 to about 15 wt. % of a fibrous material selected from the group consisting of non-swelling hydrophilic fibers and hydrophobic fibers; and
   (c) from about 0.5 to about 3 wt. % of tabletting lubricant;
wherein said activated crystalline zeolite material, said fibers and said lubricant are intimately mixed and compacted and granulated to form free-flowing granules, and wherein said granules are tabletted into said rigid composite body containing said activated zeolite molecular sieve material, said fibers and said lubricant and wherein said body is loaded with said $CO_2$ in an amount of at least 5% by weight of said activated zeolite material.

17. The method of claim 16 wherein said rigid composite body comprises:
   (a) from about 87.5 to about 98 wt. % of said zeolite material;
   (b) from about 1 to about 10 wt. % of said fibers; and
   (c) from about 1 to about 2.5 wt. % of said lubricant.

18. The method of claim 16 wherein said zeolite material comprises from about 94 to about 97%, said fibers comprise from about 2 to about 5%, and 1% of said lubricant.

19. The method of claim 16 wherein said lubricant is a metal fatty acid ester.

20. The method of claim 16 wherein said lubricant is metal stearate selected from the group consisting of magnesium, aluminum or calcium stearate.

21. The method of claim 16 wherein said lubricant is magnesium stearate.

22. The method of claim 16 wherein said lubricant is hydrogenated vegetable oil.

23. The method of claim 16 wherein, said lubricant is a hard polyethylene glycol.

24. The method of claim 16 wherein said fibers have a length of from about 100 to about 2000 microns and a diameter of from about 1 to about 50 microns.

25. The method of claim 16 wherein said fibers have a length of from 400 to about 1500 microns and a diameter of from about 1 to about 40 microns.

26. The method of claim 16 wherein said fibers have a length of from about 800 to about 1000 microns and a diameter of from 1 to about 20 microns.

27. The method of claim 16 wherein said fibers are selected from the group consisting of polyethylene, polypropylene, polyester, nylon, and cellulose.

28. The method of claim 16 wherein said rigid composite body is charged with $CO_2$ in an amount of at least 5% by wt. of said activated zeolite material prior to mixing with said fibers and said lubricant.

* * * * *

UNITED STATES PATENT AND TRADEMARK OFFICE
CERTIFICATE OF CORRECTION

PATENT NO. : 4,214,011
DATED : July 22, 1980
INVENTOR(S) : Herbert E. Strube

It is certified that error appears in the above-identified patent and that said Letters Patent are hereby corrected as shown below:

Col. 10, line 7 (Claim 14, line 1), "$CO_2$-load" should read -- $CO_2$-loaded -- ;

Col. 10, line 25 (Claim 15, line 3), "or" should read -- and -- ;

Col. 10, line 26 (Claim 15, line 4), after "channels" insert -- , cubes, and -- ;

Col. 10, line 45 (Claim 16, line 19), after "lubricant" insert a semicolon (;).

Signed and Sealed this

Twenty-eighth Day of October 1980

[SEAL]

Attest:

SIDNEY A. DIAMOND

Attesting Officer

Commissioner of Patents and Trademarks